US012717735B2

(12) United States Patent
Kim et al.

(10) Patent No.: US 12,717,735 B2
(45) Date of Patent: Aug. 25, 2026

(54) STREAMING PROTOCOL FLOW CONTROL FOR DIE-TO-DIE INTERFACES

(71) Applicant: Samsung Electronics Co., Ltd., Suwon-si (KR)

(72) Inventors: Soon Ju Kim, San Jose, CA (US); Kah Kawe Chang, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/765,210

(22) Filed: Jul. 5, 2024

(65) Prior Publication Data

US 2025/0335378 A1 Oct. 30, 2025

Related U.S. Application Data

(60) Provisional application No. 63/640,882, filed on Apr. 30, 2024.

(51) Int. Cl.
*G06F 13/20* (2006.01)

(52) U.S. Cl.
CPC .................................... *G06F 13/20* (2013.01)

(58) Field of Classification Search
CPC ...................................................... G06F 13/20
See application file for complete search history.

(56) References Cited

U.S. PATENT DOCUMENTS 7,852,757 B1 * 12/2010 Puranik .................. H04L 47/10 710/52
7,911,952 B1 * 3/2011 Nygreen ................ H04L 47/13 370/235
8,644,148 B2 2/2014 Balandin et al.
8,819,306 B2 * 8/2014 Ajanovic ............ G06F 13/4059 710/305
9,571,410 B2 2/2017 DeCusatis et al.
9,582,440 B2 * 2/2017 Gabbay ................. G06F 13/364
(Continued)

FOREIGN PATENT DOCUMENTS

WO 2022022724 A1 2/2022

OTHER PUBLICATIONS

European Extended Search Report for Application No. 25168217.5, mailed Jul. 18, 2025.

*Primary Examiner* — Henry Tsai
*Assistant Examiner* — Christopher A Daley
(74) *Attorney, Agent, or Firm* — Renaissance IP Law Group LLP

(57) ABSTRACT

Provided are systems, methods, and apparatuses for streaming protocol flow control for die-to-die interfaces. In some examples, the systems, devices, and methods include allowing a first packet to be transmitted from a source to a destination based on a credit count; decrementing the credit count based on transmitting a flit of the first packet to the destination; and incrementing the credit count based on receiving a first return credit from the destination. In some examples, the systems, devices, and methods include receiving, at a destination from a source, a first return credit in a header flit of a first packet; incrementing a credit count based on receiving the first return credit from the source; allowing a second packet to be transmitted to the source based on the credit count; and decrementing the credit count based on transmitting a flit of the second packet to the source.

19 Claims, 9 Drawing Sheets

(56) References Cited

U.S. PATENT DOCUMENTS

| | | | | |
|---|---|---|---|---|
| 10,255,218 | B1 * | 4/2019 | Tse | G06F 13/4027 |
| 10,341,130 | B2 * | 7/2019 | Schmidt | H04L 12/1863 |
| 10,374,981 | B1 * | 8/2019 | Nicol | H04L 47/2475 |
| 10,855,611 | B2 * | 12/2020 | Walker | H04L 47/39 |
| 11,429,437 | B2 * | 8/2022 | Kaushik | G06F 9/4881 |
| 11,481,343 | B1 | 10/2022 | Brewer | |
| 11,580,044 | B2 | 2/2023 | Brewer | |
| 11,792,680 | B2 | 10/2023 | Kanamarlapudi et al. | |
| 11,929,934 | B2 * | 3/2024 | Liss | H04L 47/39 |
| 12,223,168 | B1 * | 2/2025 | Zinger | G06F 3/0679 |
| 12,375,404 | B2 * | 7/2025 | Aibester | H04L 47/12 |
| 2007/0025242 | A1 * | 2/2007 | Tsang | H04L 47/10 370/229 |
| 2008/0126606 | A1 * | 5/2008 | Wang | G06F 13/385 710/29 |
| 2015/0351029 | A1 | 12/2015 | Singh et al. | |
| 2017/0031412 | A1 | 2/2017 | Gendler et al. | |
| 2018/0089117 | A1 * | 3/2018 | Nicol | G06F 13/1673 |
| 2020/0394150 | A1 | 12/2020 | Lanka et al. | |
| 2021/0281618 | A1 * | 9/2021 | Mosur | H04L 47/2416 |
| 2022/0070107 | A1 * | 3/2022 | Pospesel | H04L 47/527 |
| 2022/0113909 | A1 * | 4/2022 | Shin | G06F 3/0659 |
| 2022/0124542 | A1 | 4/2022 | Li et al. | |
| 2022/0124548 | A1 | 4/2022 | Srivastava et al. | |
| 2022/0334932 | A1 | 10/2022 | Das Sharma et al. | |
| 2022/0342840 | A1 * | 10/2022 | Das Sharma | G06F 13/4295 |
| 2023/0385138 | A1 * | 11/2023 | Kansal | H04L 1/1806 |
| 2024/0281399 | A1 * | 8/2024 | Agarwal | G06F 13/4221 |

* cited by examiner

500

| bit | 7 | 6 | 5 | 4 | 3 | 2 | 1 | 0 |
|---|---|---|---|---|---|---|---|---|
| FH B0 | BVALID | BRESP | | | | {AW crdt, AR crdt, W crdt} | | |
| FH B1 | BUSER | | | | | | | |
| FH B2 | BID | | | | | | | |
| FH B3 | | | | | | | | |

505

| bit | 7 | 6 | 5 | 4 | 3 | 2 | 1 | 0 |
|---|---|---|---|---|---|---|---|---|
| FH B0 | RVALID | RLAST | RRESP | | | {AW crdt, AR crdt, W crdt} | | |
| FH B1 | RID | | | | | | | |
| FH B2 | | | | | | | | |

| bit | 7 | 6 | 5 | 4 | 3 | 2 | 1 | 0 |
| --- | --- | --- | --- | --- | --- | --- | --- | --- |
| FH B0 | WVALID | WLAST | WSTRB On/Off | | | {R crdt, BRSP crdt} | | |
| FH B1 | WSTRB | | | | | | | |
| FH B2 | | | | | | | | |
| FH B3 | | | | | | | | |
| FH B4 | | | | | | | | |

STREAMING PROTOCOL FLOW CONTROL FOR DIE-TO-DIE INTERFACES

CROSS-REFERENCE TO RELATED APPLICATIONS

This application claims the benefit of U.S. Provisional Patent Application Ser. No. 63/640,882, filed Apr. 30, 2024, which is incorporated by reference herein for all purposes.

TECHNICAL FIELD

The disclosure relates generally to memory systems, and more particularly to streaming protocol flow control for die-to-die (D2D) interfaces.

BACKGROUND

The present background section is intended to provide context only, and the disclosure of any concept in this section does not constitute an admission that said concept is prior art.

Data communication includes the electronic transmission of information (e.g., encoded information) to, from, and/or between computing devices. A flow control mechanism can be implemented to avoid a sender overwhelming a receiver with data that the receiver is not ready to accept. Each outgoing segment can include an indication of the size of the available buffer space, and the sender may be configured to not send more data than the receiver can accommodate. However, in such systems, a receiver can be overwhelmed based on issues with system latency, etc., potentially resulting in data being dropped, which can decrease system performance. Accordingly, a need remains for systems and methods that improve network communication reliability.

SUMMARY

In various embodiments, the systems and methods described herein include systems, methods, and apparatuses for streaming protocol flow control for die-to-die interfaces. In some aspects, the systems and methods described herein relate to a . . . .

In some aspects, the techniques described herein relate to a method of die-to-die (D2D) credit-based flow control, the method including: allowing a first packet to be transmitted from a source to a destination based on a credit count; decrementing the credit count based on transmitting a flit of the first packet to the destination; and incrementing the credit count based on receiving a first return credit from the destination.

In some aspects, the techniques described herein relate to a method, further including transmitting, to the destination, a second return credit in a header flit of the first packet based on data being removed from a stack of a buffer at the source. In some aspects, the techniques described herein relate to a method, wherein: the first return credit includes an address read credit, an address write credit, or a write credit, and the second return credit includes a read credit or a write response credit.

In some aspects, the techniques described herein relate to a method, wherein a size of the buffer is based on a round-trip delay between the source and the destination. In some aspects, the techniques described herein relate to a method, wherein a size of the buffer is based on a bandwidth of the source, a bandwidth of the destination, or a bandwidth between the source and the destination.

In some aspects, the techniques described herein relate to a method, wherein the first return credit is received in a header flit of a second packet that the source receives from the destination. In some aspects, the techniques described herein relate to a method, wherein the first return credit is piggybacked on the second packet based on the second packet including at least one payload flit.

In some aspects, the techniques described herein relate to a method, wherein the second packet is received as a standalone message from the destination based on the second packet being configured without payload flits. In some aspects, the techniques described herein relate to a method, wherein transmission of return credits is synchronized to a clock cycle.

In some aspects, the techniques described herein relate to a method, wherein allowing the packet to be transmitted from the source to the destination is based on the credit count being non-zero.

In some aspects, the techniques described herein relate to a method, pausing transmission for at least one clock cycle based on a determination that the credit count is zero.

In some aspects, the techniques described herein relate to a method, wherein the credit count is maintained on a protocol layer of a die-to-die interconnect of the source.

In some aspects, the techniques described herein relate to a method, wherein the first packet includes a header flit, one or more payload flits, and a tail flit. In some aspects, the techniques described herein relate to a method, wherein the source includes a first D2D physical layer (PHY) that is communicatively linked to a second D2D PHY of the destination. In some aspects, the techniques described herein relate to a method, wherein the source includes a compute die and the destination includes a buffer die.

In some aspects, the techniques described herein relate to a method of die-to-die (D2D) credit-based flow control, the method including: receiving, at a destination from a source, a first return credit in a header flit of a first packet; incrementing a credit count based on receiving the first return credit from the source; allowing a second packet to be transmitted to the source based on the credit count; and decrementing the credit count based on transmitting a flit of the second packet to the source.

In some aspects, the techniques described herein relate to a method, further including transmitting, to the source, a second return credit in a header flit of the second packet based on data being removed from a stack of a buffer at the destination. In some aspects, the techniques described herein relate to a method, wherein: the first return credit includes a read credit or a write response credit, and the second return credit includes an address read credit, an address write credit, or a write credit.

In some aspects, the techniques described herein relate to a method, wherein the destination includes a buffer die and the source includes a compute die. In some aspects, the techniques described herein relate to a non-transitory computer-readable medium storing code that includes instructions executable by a processor of a die-to-die (D2D) credit-based flow control device to: allow a first packet to be transmitted from a source to a destination based on a credit count; decrement the credit count based on transmitting a flit of the first packet to the destination; and increment the credit count based on receiving a first return credit from the destination.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods may be implemented in high-performance computing (HPC), artificial intelligence (AI) hardware systems, AI systems with high-bandwidth memory (HBM), memory systems with D2D interfaces (e.g., 3D HBM, 2.5D HBM). The systems and methods of streaming protocol flow control for die-to-die interfaces described herein include multiple advantages and benefits. For example, the systems and methods reduce the latency in cases where a source may be stalled waiting for response from a destination. Additionally, the systems and methods remove the need for error prone design at the destination after the destination has signaled not ready, where in the error prone design the destination is required to continue absorbing data from the source to prevent data drop.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 5 illustrates an example data structure in accordance with one or more implementations as described herein.

Figure 1:
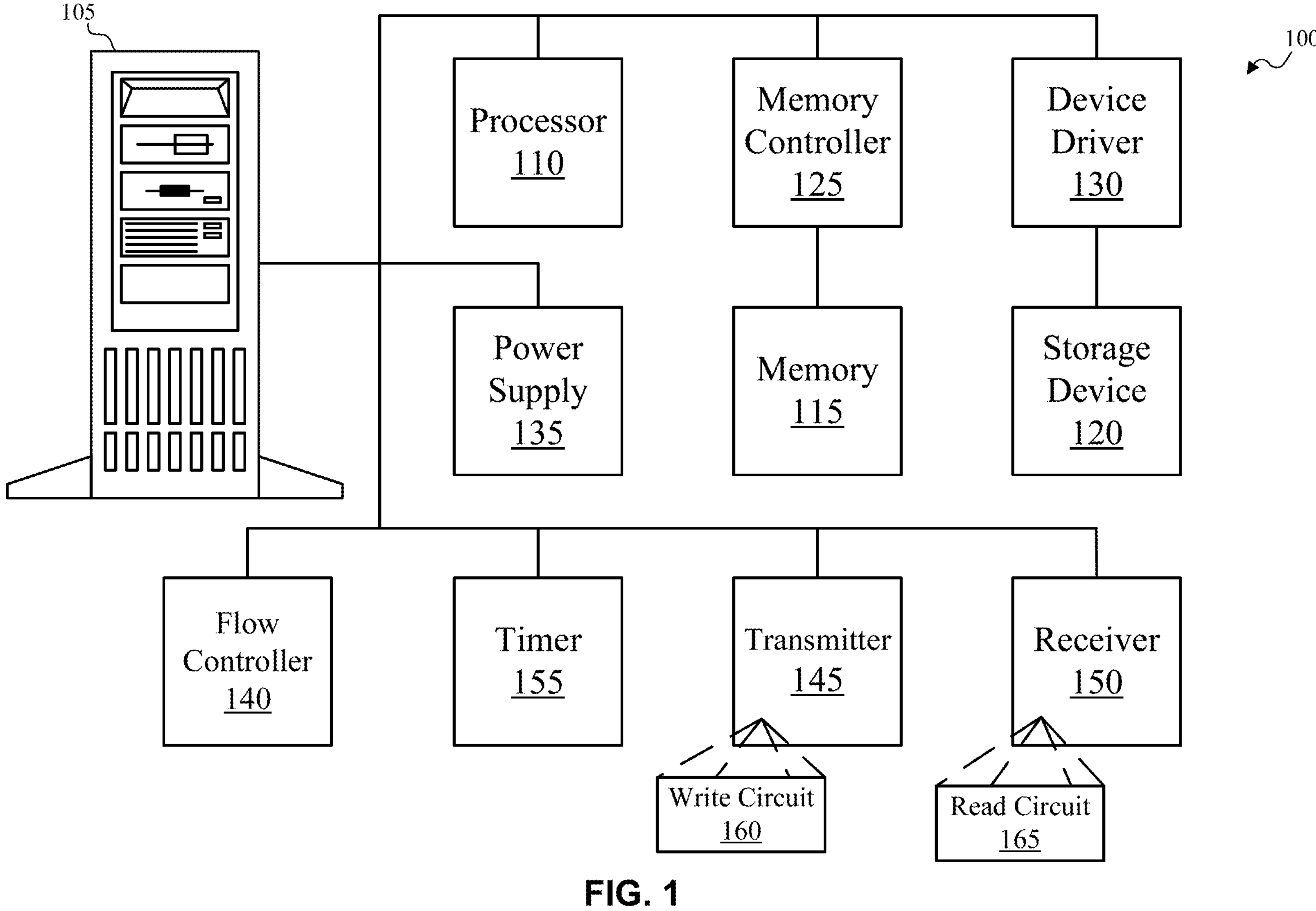
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

A die-to-die (D2D) interface can include a functional block that connects two silicon dies within the same package, allowing data transfer between the connected dies. D2D interfaces can be used in applications such as artificial intelligence (AI), networking, high-performance computing (HPC), hyperscale data centers, and the like. D2D interfaces can provide improved bandwidth and power efficiency over other chip-to-chip interfaces. D2D interfaces can include a controller block and a physical layer (PHY), where the PHY can include the first and lowest layer of the seven-layer Open Systems Interconnection (OSI) model of computer networking. D2D interfaces can implement various architectures, such as high-density parallel architectures or a high-speed Serializer/Deserializer (SerDes). The D2D Controller may be a link layer of the protocol stack, and may have the least latency and area overhead compared to other protocols. D2D interfaces can include Advanced Interface Bus (AIB), Universal Chiplet Interconnect Express (UCIe), and 112G Extra Short Reach (XSR), Advanced extensible Interface (AXI), etc. AXI can include a high-performance, point-to-point, master-slave parallel bus that connects on-chip peripheral circuits to processor cores. The AXI protocol can include five channels. In some cases, an AXI channel (e.g., each channel) may include its own prefix and associated VALID and READY signals. The AXI channels may include Address Read (AR) channel from master to slave; Read Data (R) channel from slave to master; Address Write (AW) channel from master to slave; Write Data (W) channel from master to slave; and Write Response (B) channel from slave to master. In some cases, the Write Response channel may be referred to as B, BRSP, or BRESP.

The AW channel can be independent from the W channel. This can mean that AW transactions can begin before anything exists on the W channel. The W channel can include write strobe (WSTRB) information. Each channel can include a source and a destination, where the source puts data on the channel and the destination receives it. The source can assert the VALID signal when sending data, and the destination can assert READY to accept the data. In some cases, READY can be asserted independently from VALID. A successful transfer of information can occur when both VALID and READY are on (e.g., at binary 1, valid=true, ready=true). The B channel can signal response information for write transactions (e.g., acknowledge receipt of a final portion of a packet, acknowledge all portions of a packet are correctly received). The B channel can be signaled after the final data transfer of a write transaction. For write transactions, AXI can provide one write response on the B channel for an entire burst (e.g., not for each data transfer or each flit within the burst).

In computer networking, flow control unit or flow control digit (flit) can include a link-level atomic element that forms a network packet or stream. Flits can be the smallest unit on which flow control is performed and may be delivered in a pipeline fashion. In some cases, the first flit of a packet may be referred to as a header flit. The header flit may include information about the packet's route (e.g., destination address) and set up the routing behavior for all subsequent flits associated with that packet. The header flit may be followed by zero or more body flits, containing the payload of data. In some cases, a standalone message may include a header flit and a tail flit without a payload, (e.g., without payload flits, without payload of data). The final flit may be referred to as the tail flit. The tail flit may perform some book keeping to close the connection between the two nodes. An example of a packet being transmitted via flits can include a packet transmitted between source A and destination B. A packet may be split into flits W, X, Y and Z (e.g., payload flits W, X, Y, and Z transmitted before a header flit and after a tail flit). The transmit buffer in A may load the first flit Z and send it to B. After B receive Z, B may move the Z flit out of the buffer (e.g., to memory). The transmit buffer in A may then load the next flit Y and send it to B. After B receives Y, B may move the Y flit out of the buffer (e.g., to memory). The same procedure may be performed for flits X and W. Once B receives flits W, X, Y, and Z, B may then put together all the flits to form the whole packet (e.g., and send a write response indicating reception of all flits). In some cases, the term "push" may refer to inserting data in a stack data structure, while "pop" may refer to removing data from the stack data structure. A stack data structure can include a First In First Out (FIFO) buffer, First In Last Out (FILO) buffer, Last In First Out (LIFO) buffer, or Last In Last Out (LILO) buffer. The systems and methods described herein may implement at least one type of stack data structure (e.g., TX FIFO, RX FIFO, etc.).

A packet may be decomposed into one or more flits, which include a header flit, body flits, and, in some cases, a tail flit. The header flit may hold information about the packet's route and may set up the routing behavior for subsequent flits associated with the packet. The other flits may include the data elements. Flit-reservation flow control can include a technique where control flits traverse the network in advance of data flits, reserving buffers. Flit-reservation flow control can reduce data latency and increases saturation throughput for a fixed amount of buffer space.

In some examples, a streaming protocol for a D2D interface (e.g., AXI) can employ a "valid-ready" handshake for data transfer. The "valid" signal may be originated from the source and embedded in the transmit (TX) flit. The "valid" signal, via the TX flit, may travel through relatively long pipelines to reach the destination, which may be located at the other end of the D2D link. Similarly, the "ready" signal may originate from the destination and may be embedded in the receive (RX) flit. The "ready" signal, via the RX flit, may travel through the relatively long pipelines to reach the source. The relatively long travel times of the TX flit and RX flit results in undesirable latency, as the source is stalled waiting for the "ready" signal to arrive. Moreover, the destination may continue absorbing data from the source after the destination indicates it is not ready (e.g., "ready" signal indicates destination is not ready). If the destination does not continue absorbing data from the source, data drop can result, potentially causing further delay and latency (e.g., decreased system performance).

The systems and methods described herein may provide a credit-based flow control. For example, the systems and methods may provide a credit-based flow control based on converting a streaming protocol to flit. In some examples, credit (e.g., a maximum credit) in the credit-based flow control may be based on a storage buffer size at the destination (e.g., size of a FIFO buffer at the destination). In some cases, a buffer size may be selected based on a round-trip delay or a bandwidth (e.g., D2D bandwidth). For example, a buffer size may be selected based on a product of the round-trip delay between source and destination and a bandwidth of the source and/or destination. Accordingly, a maximum credit may be based on a buffer size, where the buffer size is based on a product of the round-trip delay between source and destination (e.g., in seconds) and a bandwidth of the source and/or destination (e.g., in bits per second), where the product provides a bit size of the buffer. Additionally, or alternatively, a maximum credit may be selected based on a default value. Additionally, or alternatively, the source and/or the destination may select a maximum credit based on one or more messages communicated between the source and the destination. In some cases, the source and/or destination (e.g., host of the source and/or host of the destination) may determine or assign credit (e.g., maximum credit) at initialization.

In some cases, the source may monitor or track the credit count. In some aspects, the source may decrement a credit count when a flit is sent. The source may stop transmitting when the source determines that the credit count reaches zero. In some cases, the destination may return credit via a flit header when a buffer is freed (e.g., when an entry in buffer is empty, when buffer is empty). In some cases, return credit may be returned via a flit header over a main data path. In some examples, the source may increment the credit count when a credit is received (e.g., received from the destination). In some cases, a buffer size may be configured to be greater than (e.g., greater than or equal to) the round-trip delay between the source and destination. In some cases, credit return for a TX flit (e.g., AW, AR, W) may be encoded in an RX flit (e.g., R, BRSP). In some cases, credit return for an RX flit (e.g., R, BRSP) may be encoded in a TX flit (e.g., AW, AR, W). In some cases, credit return can be piggyback with a payload (e.g., a packet with payload flits), or in a standalone message when there is no payload to transfer (e.g., a packet without payload flits).

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for ease of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115.

Machine 105 may include power supply 135. Power supply 135 may provide power to machine 105 and its components. Machine 105 may include transmitter 145 and receiver 150. Transmitter 145 or receiver 150 may be respectively used to transmit or receive data (e.g., flits, credit increments, credit returns, etc.). In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include timer 155 (e.g., time keeper, sync signal, measure delay, indicate communication time outs, etc.).

Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, InfiniBand, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, flow controller 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of flow controller 140 may be implemented as an SoC.

In some examples, flow controller 140 may include any one or combination of logic (e.g., logical circuit), hardware (e.g., processing unit, memory, storage), software, firmware, and the like. In some cases, flow controller 140 may perform one or more functions in conjunction with processor 110. In some cases, at least a portion of flow controller 140 may be implemented in or by processor 110 and/or memory 115. The one or more logic circuits of flow controller 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable flow controller 140 to provide streaming protocol flow control for die-to-die interfaces.

In one or more examples, flow controller 140 may provide a credit-based flow control. For example, flow controller 140 may provide a credit-based flow control based on converting a streaming protocol to flit. In some examples, credit (e.g., a maximum credit) at a source may be based on a storage buffer size at the destination. In some cases, the source and/or destination (e.g., host of the source and/or host of the destination) may determine or assign credit (e.g., maximum credit) at initialization. In some cases, a maximum credit may be selected based on a default value. Additionally, or alternatively, the source and/or the destination may select a maximum credit based on one or more messages communicated between the source and the destination. In some cases, the source may monitor or track the credit count. In some aspects, the source may decrement a credit count when a flit is sent. The source may stop transmitting when the source determines that the credit count reaches zero. In some cases, the destination may return credit via a flit header when a buffer is freed (e.g., when an entry in buffer is empty, when buffer is empty). In some examples, the source may increment the credit count when a credit is received (e.g., received from the destination). In some cases, a buffer size may be configured to be greater than (e.g., greater than or equal to) the round-trip delay between the source and destination.

Figure 2:
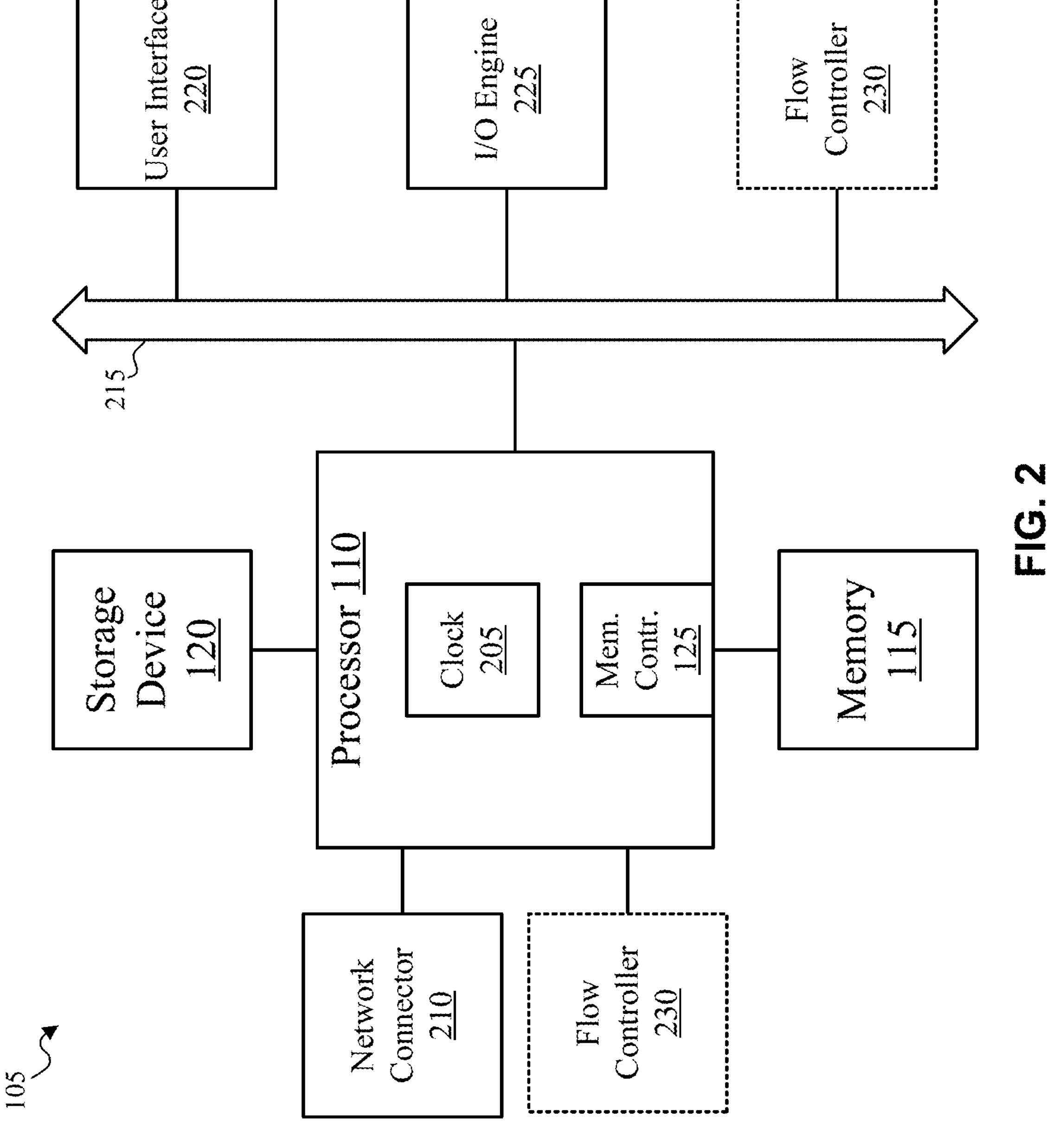
FIG. 2 illustrates details of the system of FIG. 1, according to one or more implementations as described herein.

FIG. 2 illustrates details of machine 105 of FIG. 1, according to examples described herein. In the illustrated example, machine 105 may include one or more processors 110, which may include memory controllers 125 and clocks 205, which may be used to coordinate the operations of the components of the machine. Processors 110 may be coupled to memories 115, which may include random access memory (RAM), read-only memory (ROM), or other state preserving media, as examples. Processors 110 may be coupled to storage devices 120, and to network connector 210, which may be, for example, an Ethernet connector or a wireless connector. Processors 110 may be connected to buses 215, to which may be attached user interfaces 220 and Input/Output (I/O) interface ports that may be managed using I/O engines 225, among other components. As shown, processors 110 may be coupled to flow controller 230, which may be an example of flow controller 140 of FIG. 1. Additionally, or alternatively, processors 110 may be connected to buses 215, to which may be attached flow controller 230.

Figure 3:
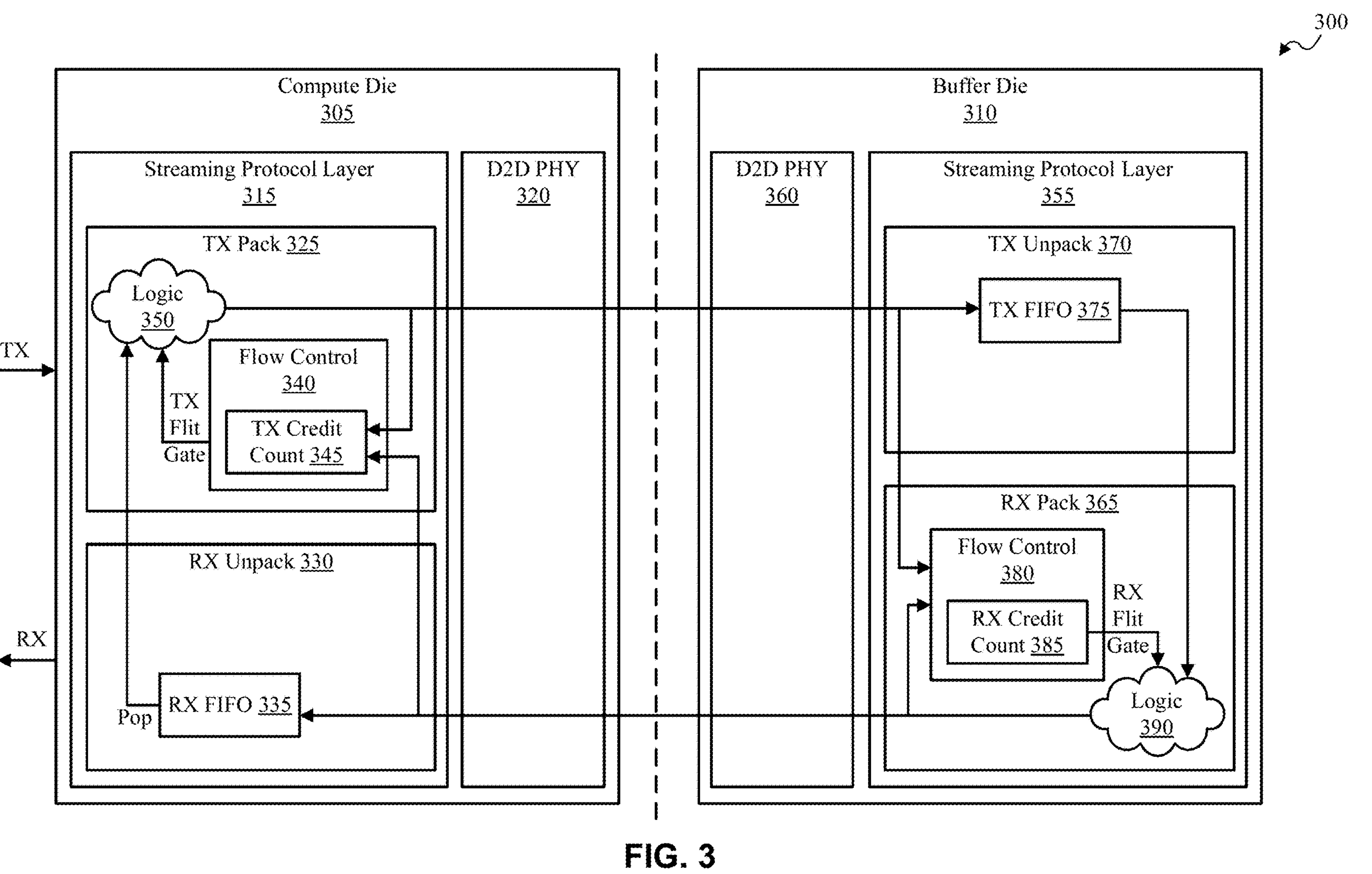
FIG. 3 illustrates an example system in accordance with one or more implementations as described herein.

FIG. 3 illustrates an example system 300 in accordance with one or more implementations as described herein. In the illustrated example, system 300 may include compute die 305 and buffer die 310. As shown, compute die 305 may include streaming protocol layer 315 and die to die adapter physical layer (D2D PHY) 320. In some cases, compute die 305 may include a UCIe die and/or buffer die 310 may include a UCIe die.

In the illustrated example, streaming protocol layer 315 may include transmit (TX) pack 325 and receive (RX) unpack 330. As shown, RX unpack 330 includes RX FIFO 335. TX pack 325 includes flow control 340, TX credit count 345 (e.g., credit counter on protocol layer of UCIe die), and logic 350. As shown, buffer die 310 may include streaming protocol layer 355 and D2D PHY 360 communicatively coupled to D2D PHY 320. In some cases, D2D PHY 320 may include a UCIe PHY and/or D2D PHY 360 may include a UCIe PHY. In the illustrated example, streaming protocol layer 355 may include RX pack 365 and TX unpack 370. As shown, TX unpack 370 includes TX FIFO 375. RX pack 365 includes flow control 380, RX credit count 385 (e.g., credit counter on protocol layer of UCIe die), and logic 390.

TX pack 325 and/or RX pack 365 may include packing logic (e.g., hardware, firmware, software, IC logical circuitry) and/or a packing controller (e.g., microcontroller, FPGA, processing unit) to perform one or more operations described herein. RX unpack 330 and/or TX unpack 370 may include unpacking logic (e.g., hardware, firmware, software, IC logical circuitry) and/or an unpacking controller (e.g., microcontroller, FPGA, processing unit) to perform one or more operations described herein. In some cases, TX pack 325, RX unpack 330, RX pack 365, and/or TX unpack 370 may incorporate and/or operate in conjunction with at least a portion of flow controller 140 and/or flow controller 230.

In some examples, logic 350 and/or logic 390 may include user control logic. For example, logic 350 and/or logic 390 may include logic that enables a user to configure one or more aspects associated with streaming protocol flow control for die-to-die interfaces. For example, logic 350 and/or logic 390 may include logic that enables a user to configure flow control, configure aspects of packets (e.g., packet size, packet format, packet fields, buffer size, flit size, flits per packet, maximum credit counts, etc.). In some examples, logic 350 and/or logic 390 may include a user interface that enables a user to view one or more aspects of the systems and methods described herein (e.g., view packet flow rate, bandwidth, latency, round trip delay, errors, error rate, etc.). In some cases, logic 350 and/or logic 390 may incorporate and/or operate in conjunction with at least a portion of flow controller 140 and/or flow controller 230.

In some examples, credit (e.g., a maximum credit) at a source may be based on a storage buffer size at the destination. When compute die 305 transmits a packet or flit to buffer die 310, then compute die 305 may be the source and buffer die 310 may be the destination. When compute die 305 receives a packet or flit from buffer die 310, then compute die 305 may be the destination and buffer die 310 may be the source. In some cases, a buffer size at compute die 305 may be similar in size (e.g., the same) compared to a buffer size at buffer die 310. Alternatively, a buffer size at compute die 305 may be different in size (e.g., less than, greater than) compared to a buffer size at buffer die 310.

In some examples, the buffer size of RX FIFO 335 and/or TX FIFO 375 may be based on a round-trip delay between compute die 305 and buffer die 310. In some cases, the buffer size of RX FIFO 335 and/or TX FIFO 375 may be based on a bandwidth (e.g., D2D bandwidth) of compute die 305, a bandwidth of buffer die 310, and/or a bandwidth between compute die 305 and buffer die 310. In some cases, the bandwidth of compute die 305, the bandwidth of buffer die 310, and/or the bandwidth between compute die 305 and buffer die 310 may be measured in a unit of data per unit of time (e.g., bits per second), while the round-trip delay between compute die 305 and buffer die 310 may be measured in a unit of time (e.g., seconds). Thus, in some examples, the buffer size of RX FIFO 335 and/or TX FIFO 375 may be based on a product of round-trip delay and bandwidth (e.g., greater than the product of round-trip delay*bandwidth).

System 300 illustrates an example system in accordance with one or more implementations as described herein. As shown, system 300 may include a system of streaming protocol flow control for die-to-die interfaces. In the illustrated example, compute die 305 may transmit TX flits to buffer die 310 and/or buffer die 310 may transmit RX flits to compute die 305. As shown, streaming protocol layer 315 may transmit a TX flit to buffer die 310. As shown, flow control 340 may determine a TX credit count based on TX credit count 345. In some cases, flow control 340 may include a TX flit gate configured to check TX credit count 345. In some cases, flow control 380 may include an RX flit gate configured to check RX credit count 385.

In some cases, TX flit gate of flow control 340 may determine whether TX credit count 345 is zero or non-zero. When flow control 340 (e.g., TX flit gate of flow control 340) and/or logic 350 determines that TX credit count 345 is zero for a given clock cycle, flow control 340 (e.g., TX flit gate of flow control 340) and/or logic 350 may prohibit transmission of a TX flit for at least that clock cycle. When flow control 340 (e.g., TX flit gate of flow control 340) and/or logic 350 determines that TX credit count 345 is non-zero for a given clock cycle, flow control 340 (e.g., TX flit gate of flow control 340) and/or logic 350 may allow transmission of a TX flit for that clock cycle. In some cases, a TX flit from compute die 305 may include an RX credit for buffer die 310. In some cases, buffer die 310 may identify the RX credit in a received TX flit and apply the RX credit to streaming protocol layer 355 (e.g., increment RX credit count 385 in flow control of buffer die 310). In some cases, TX unpack 370 may receive the TX flit and unpack the TX flit. When the TX unpack 370 determines the TX flit includes a payload (e.g., data), TX unpack 370 may push (e.g., add) the data to a stack of TX FIFO 375. In some cases, TX unpack 370 may pop (e.g., remove) a different data entry from TX FIFO 375 and send the popped data to logic 390. In some cases, the popped data may be sent to memory controller 125 of FIG. 1. The popped data may be signaled to logic 390 (e.g., to generate a TX credit return to compute die 305). When TX unpack 370 determines that the unpacked TX flit includes an RX credit, TX unpack 370 may route the credit to RX credit counter 385, incrementing the RX credit count.

As shown, streaming protocol layer 355 may transmit an RX flit to compute die 305. As with TX flits, flow control 380 (e.g., RX flit gate of flow control 380) and/or logic 390 may allow transmission of RX flits when RX credit count 385 is non-zero and prohibit transmission of RX flits when RX credit count 385 is zero. In some cases, an RX flit transmitted by buffer die 310 may include a TX credit. In some cases, RX unpack 330 may receive the RX flit and unpack the RX flit. When the RX unpack 330 determines the RX flit includes a payload (e.g., data), RX unpack 330 may push (e.g., add) the data to a stack of RX FIFO 335. In some cases, RX unpack 330 may pop (e.g., remove) a different data entry from RX FIFO 335 and send the popped data to logic 350. In some cases, the popped data may be sent to host processor 110 of FIG. 1. The popped data may be signaled to logic 350 (e.g., to generate an RX credit return to buffer die 310). When RX unpack 330 determines that the unpacked RX flit includes a TX credit, RX unpack 330 may route the credit to TX credit counter 345, incrementing the TX credit count. The compute die may identify the TX credit and apply it to the streaming protocol layer of the compute die (e.g., increment TX credit count in flow control of the compute die). It is noted that D2D PHY 320 and/or D2D PHY 360 may be configured to transmit the physical signals of TX flits and/or RX flits between compute die 305 and buffer die 310.

Figure 4:
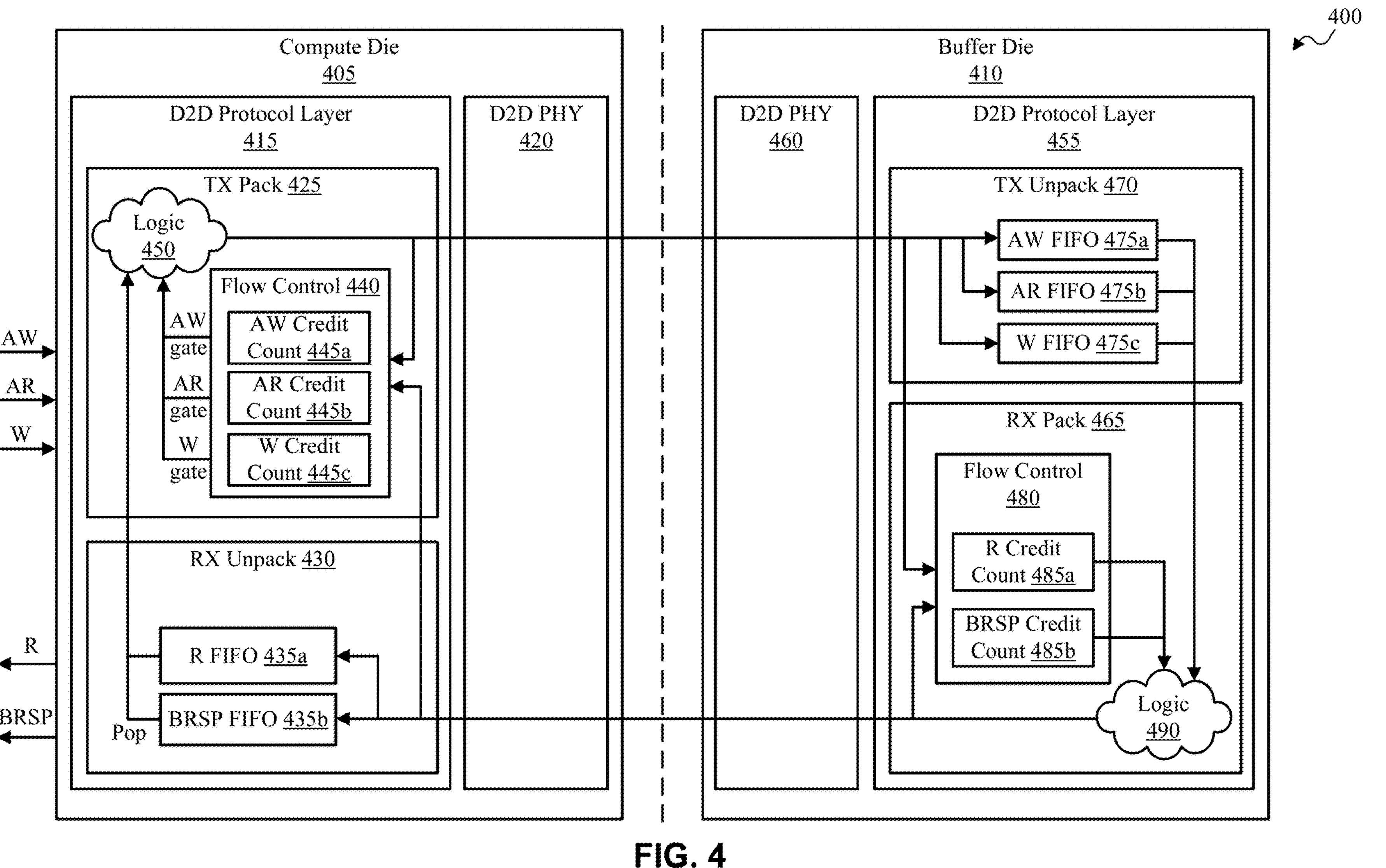
FIG. 4 illustrates an example system in accordance with one or more implementations as described herein.

FIG. 4 illustrates an example system 400 in accordance with one or more implementations as described herein. In the illustrated example, system 400 may include compute die 405 and buffer die 410. In some cases, compute die 405 may include a UCIe die and/or buffer die 410 may include a UCIe die. As shown, compute die 405 may include D2D protocol layer 415 and die to die adapter physical layer (D2D PHY) 420. In the illustrated example, D2D protocol layer 415 may include transmit (TX) pack 425 and receive (RX) unpack 430. As shown, RX unpack 430 includes one or more FIFOs (e.g., read (R) FIFO 435*a* and write response (BRSP) FIFO 435*b*). TX pack 425 includes flow control 440, one or more credit counters (e.g., address write (AW) credit count 445*a*, address read (AR) credit count 445*b*, write (W) credit counter 445*c* on protocol layer of UCIe die), and logic 450. As shown, buffer die 410 may include D2D protocol layer 455 and D2D PHY 460 communicatively coupled to D2D PHY 420. In some examples, compute die 405 and/or buffer die 410 may include a flit-aware die-to-die interface (FDI), which may include and/or be implemented in conjunction with D2D protocol layer 415, D2D PHY 420, D2D protocol layer 455, and/or D2D PHY 460. In some cases, D2D PHY 420 may include a UCIe PHY and/or D2D PHY 460 may include a UCIe PHY.

In some cases, D2D protocol layer 415 may include an AXI D2D protocol layer (e.g., D2D protocol layer configured with an AXI interface). Additionally, or alternatively, D2D protocol layer 455 may include an AXI D2D protocol layer (e.g., D2D protocol layer configured with an AXI interface). In the illustrated example, D2D protocol layer 455 may include RX pack 465 and TX unpack 470. As shown, TX unpack 470 includes one or more FIFOs (e.g., address write (AW) FIFO 475*a*, address read (AR) FIFO 475*b*, write (W) FIFO 475*c*). RX pack 465 includes flow control 480, one or more credit counters (e.g., read (R) credit count 485*a* and write response (BRSP) credit count 485*b* on protocol layer of UCIe die), and logic 490.

TX pack 425 and/or RX pack 465 may include packing logic (e.g., hardware, firmware, software, IC logical circuitry) and/or a packing controller (e.g., microcontroller, FPGA, processing unit) to perform one or more operations described herein. RX unpack 430 and/or TX unpack 470 may include unpacking logic (e.g., hardware, firmware, software, IC logical circuitry) and/or an unpacking controller (e.g., microcontroller, FPGA, processing unit) to perform one or more operations described herein. In some cases, TX pack 425, RX unpack 430, RX pack 465, and/or TX unpack 470 may incorporate and/or operate in conjunction with at least a portion of flow controller 140 and/or flow controller 230.

In some examples, logic 450 and/or logic 490 may include user control logic. For example, logic 450 and/or logic 490 may include logic that enables a user to configure one or more aspects associated with streaming protocol flow control for die-to-die interfaces. For example, logic 450 and/or logic 490 may include logic that enables a user to configure flow control, configure aspects of packets (e.g., packet size, packet format, packet fields, buffer size, flit size, flits per packet, maximum credit counts, etc.). In some examples, logic 450 and/or logic 490 may include a user interface that enables a user to view one or more aspects of the systems and methods described herein (e.g., view packet flow rate, bandwidth, latency, round trip delay, errors, error rate, etc.). In some cases, logic 450 and/or logic 490 may incorporate and/or operate in conjunction with at least a portion of flow controller 140 and/or flow controller 230.

In some examples, credit (e.g., a maximum credit) at a source may be based on a storage buffer size at the destination. When compute die 405 transmits a packet or flit to buffer die 410, then compute die 405 may be the source and buffer die 410 may be the destination. When compute die 405 receives a packet or flit from buffer die 410, then compute die 405 may be the destination and buffer die 410 may be the source. In some cases, a buffer size at compute die 405 may be similar in size (e.g., the same) compared to a buffer size at buffer die 410. Alternatively, a buffer size at compute die 405 may be different in size (e.g., less than, greater than) compared to a buffer size at buffer die 410. In some cases, R FIFO 435*a* may be similar in size (e.g., the same) or different in size (e.g., less than, greater than) compared to W FIFO 475*c*. In some cases, AW FIFO 475*a* may be similar or different in size compared to AR FIFO 475*b* and/or BRSP FIFO 435*b*; AR FIFO 475*b* may be similar or different in size compared to AW FIFO 475*a* and/or BRSP FIFO 435*b*; W FIFO 475*c* may be similar or different in size compared to R FIFO 435*a*.

In some examples, the buffer size of a buffer of compute die 405 (e.g., R FIFO 435*a*, BRSP FIFO 435*b*) and/or the buffer size of a buffer of buffer die 410 (e.g., AW FIFO 475*a*, AR FIFO 475*b*, and/or W FIFO 475*c*) may be based on a round-trip delay between compute die 405 and buffer die 410. In some cases, the buffer size of a buffer of compute die 405 and/or the buffer size of a buffer of buffer die 410 may be based on a bandwidth (e.g., D2D bandwidth) of compute die 405, a bandwidth of buffer die 410, and/or a bandwidth between compute die 405 and buffer die 410. A bandwidth of compute die 405 may be based on a bandwidth of D2D PHY 420. A bandwidth of buffer die 410 may be based on a bandwidth of D2D PHY 460. A bandwidth between compute die 405 and buffer die 410 may be based on a bandwidth between D2D PHY 420 and D2D PHY 460.

In some cases, the bandwidth of compute die 405, the bandwidth of buffer die 410, and/or the bandwidth between compute die 405 and buffer die 410 may be measured in a unit of data per unit of time (e.g., bits per second), while the round-trip delay between compute die 405 and buffer die 410 may be measured in a unit of time (e.g., seconds). Thus, in some examples, the buffer size of a buffer of compute die 405 and/or the buffer size of a buffer of buffer die 410 may be based on a product of round-trip delay and bandwidth (e.g., greater than the product of round-trip delay*bandwidth). As shown, D2D protocol layer 415 in conjunction with D2D PHY 420 may transmit one or more flits (e.g., AW flit, AR flit, and/or W flit) to D2D protocol layer 455 via D2D PHY 460. In some cases, D2D protocol layer 455 in conjunction with D2D PHY 460 may transmit one or more flits (e.g., R flit, BRSP flit) to D2D protocol layer 415 via D2D PHY 420.

A data flow from compute die 405 (e.g., source) to buffer die 410 (e.g., destination) may include one or more types of data flow. In some cases, the data flow may include a write command (e.g., via AW AXI channel), a read command (e.g., via AR AXI channel), and/or write data flow (e.g., via AXI W channel). In some cases, compute die 405 may maintain, monitor, and/or track a credit count (e.g., maximum credit count, total credit count, available credit count) for transmitting flits to buffer die 410. In some cases, compute die 405 may maintain, monitor, and/or track at least one of a first credit count for the AW AXI channel via AW credit count 445*a*, a second credit count for the AR AXI channel via AR credit count 445*b*, and/or a third credit count for the W AXI channel via W credit count 445*c*. In some cases, compute die 405 may maintain a total credit count via the depicted credit counts of flow control 440. In some cases, compute die 405 may initialize a maximum credit upon powering up and/or upon reset. For example, compute die 405 may initialize AW credit count 445*a* to its maximum credit amount upon reset, initialize AR credit count 445*b* to its maximum credit amount upon reset, and so on. In some cases, the maximum credit count is the same for each counter, or may vary among counters. Compute die 405 may decrement a credit count of a given AXI channel by 1 when one flit is sent on that AXI channel. Compute die 405 may increment a credit count of a given AXI channel by 1 when a credit is returned from buffer die 410 for that AXI channel. For example, compute die 405 may decrement a credit count of W credit count 445*c* when a W flit is sent on the W AXI channel, or may increment a credit counter of AR credit count 445*b* when an AR credit is returned by buffer die 410. In some cases, compute die 405 gates (e.g., pauses, blocks, holds) an outgoing flit of a given AXI channel when a credit count for that AXI channel is zero. In some examples, buffer die 410 may return a credit (e.g., in conjunction with logic 490) to compute die 405 for a given AXI channel when a flit of that of that AXI channel is popped out of a FIFO corresponding to that AXI channel. For example, when logic 490 determines that an AR flit is popped out of AR FIFO 475*b*, logic 490 may return an AR credit to compute die 405, which may be routed to AR credit count 445*b*. In some cases, credit may be returned via a BRSP flit or an R flit from buffer die 410.

A data flow from buffer die 410 (e.g., source) to compute die 405 (e.g., destination) may include one or more types of data flow. In some cases, the data flow may include a read data flow (e.g., via AXI R channel) and/or a write completion (e.g., via AXI BRSP channel). In some cases, buffer die 410 may maintain, monitor, and/or track a credit count (e.g., maximum credit count, total credit count, available credit count) for transmitting flits to compute die 405. In some cases, buffer die 410 may maintain, monitor, and/or track at least one of a first credit count for the R AXI channel via R credit count 485*a* and/or a second credit count for the BRSP AXI channel via BRSP credit count 485*b*. In some cases, buffer die 410 may maintain a total credit count via the depicted credit counts of flow control 480. In some cases, buffer die 410 may initialize a maximum credit upon powering up and/or upon reset. For example, buffer die 410 may initialize R credit count 485*a* to its maximum credit amount upon reset, initialize BRSP credit count 485*b* to its maximum credit amount upon reset, and so on. In some cases, the maximum credit count is the same for each counter, or may vary among counters. Buffer die 410 may decrement a credit count of a given AXI channel by 1 when one flit is sent on that AXI channel. Buffer die 410 may increment a credit count of a given AXI channel by 1 when a credit is returned from compute die 405 for that AXI channel. For example, buffer die 410 may decrement a credit count of BRSP credit count 485*b* when a BRSP flit is sent on the BRSP AXI channel, or may increment a credit counter of R credit count 485*a* when an R credit is returned by compute die 405. In some cases, buffer die 410 gates (e.g., pauses, blocks, holds) an outgoing flit of a given AXI channel when a credit count for that AXI channel is zero. In some examples, compute die 405 may return a credit (e.g., in conjunction with logic 450) to buffer die 410 for a given AXI channel when a flit of that AXI channel is popped out of a FIFO corresponding to that AXI channel. For example, when logic 450 determines that a BRSP flit is popped out of BRSP FIFO 435*b*, logic 450 may return a BRSP credit to buffer die 410, which may be routed to BRSP credit count 485*b*. In some cases, credit may be returned via an AW flit, AR flit, and/or W flit from compute die 405.

FIG. 5 illustrates an example data structure (e.g., flit format 500) and flit format 505 in accordance with one or more implementations as described herein. In the illustrated example, flit format 500 includes fields of a write response (B) flit, which includes a write response valid (BVALID) field, a write response (BRESP) field, a credit return field (e.g., 3-bit field for AW credit, AR credit, and W credit return), a write response user (BUSER) field, and a write response ID (BID) field. In some cases, buffer die 410 may transmit a write response flit based on flit format 500. In some cases, the depicted credit return field is part of a header of a write response flit. In some cases, credits may be returned one credit at a time (e.g., per AXI channel). A credit may be sent piggyback (e.g., BVALID set high), or in a standalone message (e.g., without payload flits).

As shown, flit format 505 includes fields of a read (R) flit, which includes a read valid (RVALID) field, a read last (RLAST) field, a read response (RRESP) field, a credit return field (e.g., 3-bit field for AW credit, AR credit, and W credit return), and a read ID field (RID). In some cases, buffer die 410 may transmit a read flit based on flit format 505. In some cases, the depicted credit return field is part of a header of a read flit. In some cases, credits may be returned one credit at a time (e.g., per AXI channel). A credit may be sent piggyback (e.g., RVALID set high), or in a standalone message (e.g., without payload flits).

Figure 6:
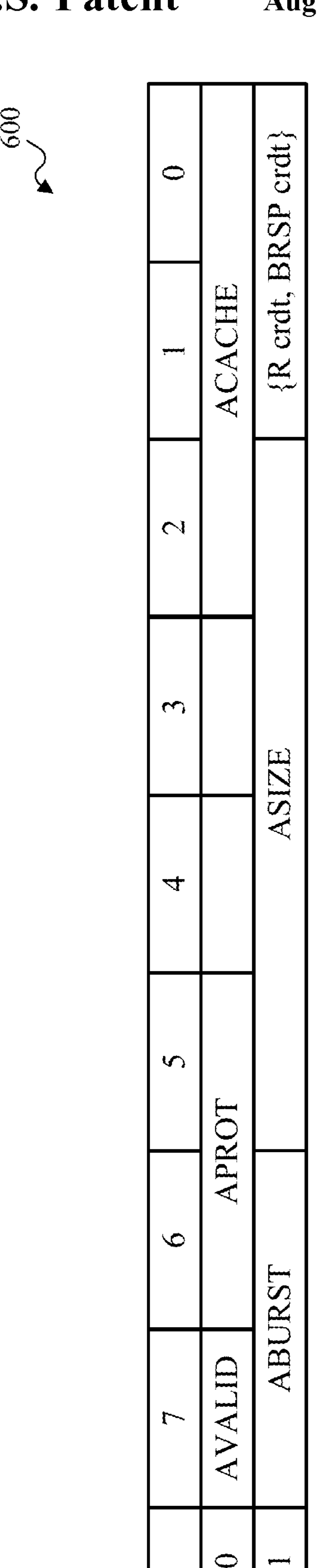
FIG. 6 illustrates an example data structure in accordance with one or more implementations as described herein.

FIG. 6 illustrates an example data structure (e.g., flit format 600) and flit format 605 in accordance with one or more implementations as described herein. In the illustrated example, flit format 600 includes fields of a command flit (e.g., AW command flit, AR command flit), which includes an address valid (AVALID) field (e.g., AW valid, AR valid), an access permission (APROT) field (e.g., AW access permission, AR access permission), an address cache (ACACHE) field (e.g., AW cache field, AR cache), an address burst (ABURST) field (e.g., AW burst, AR burst), an address size (ASIZE) field (e.g., AW size, AR size), and a credit return field (e.g., 2-bit field for R credit, and BRSP credit return). In some cases, compute die 405 may transmit an address write command flit or address read command flit based on flit format 600. In some cases, the depicted credit return field is part of a header of an address write command flit or address read command flit. In some cases, credits may be returned one credit at a time (e.g., one per AXI channel). A credit may be sent piggyback (e.g., AVALID set high), or in a standalone message (e.g., without payload flits).

As shown, flit format 605 includes fields of a write (W) flit, which includes a write valid (WVALID) field, a write last (WLAST) field, a write strobe activation field (WSTRB On/Off), a credit return field (e.g., 2-bit field for R credit and BRSP credit return), and a write strobe field (WSTRB). In some cases, compute die 405 may transmit a write flit based on flit format 605. In some cases, the depicted credit return field is part of a header of a write flit. In some cases, credits may be returned one credit at a time (e.g., per AXI channel). A credit may be sent piggyback (e.g., WVALID set high), or in a standalone message (e.g., without payload flits).

Figure 7:
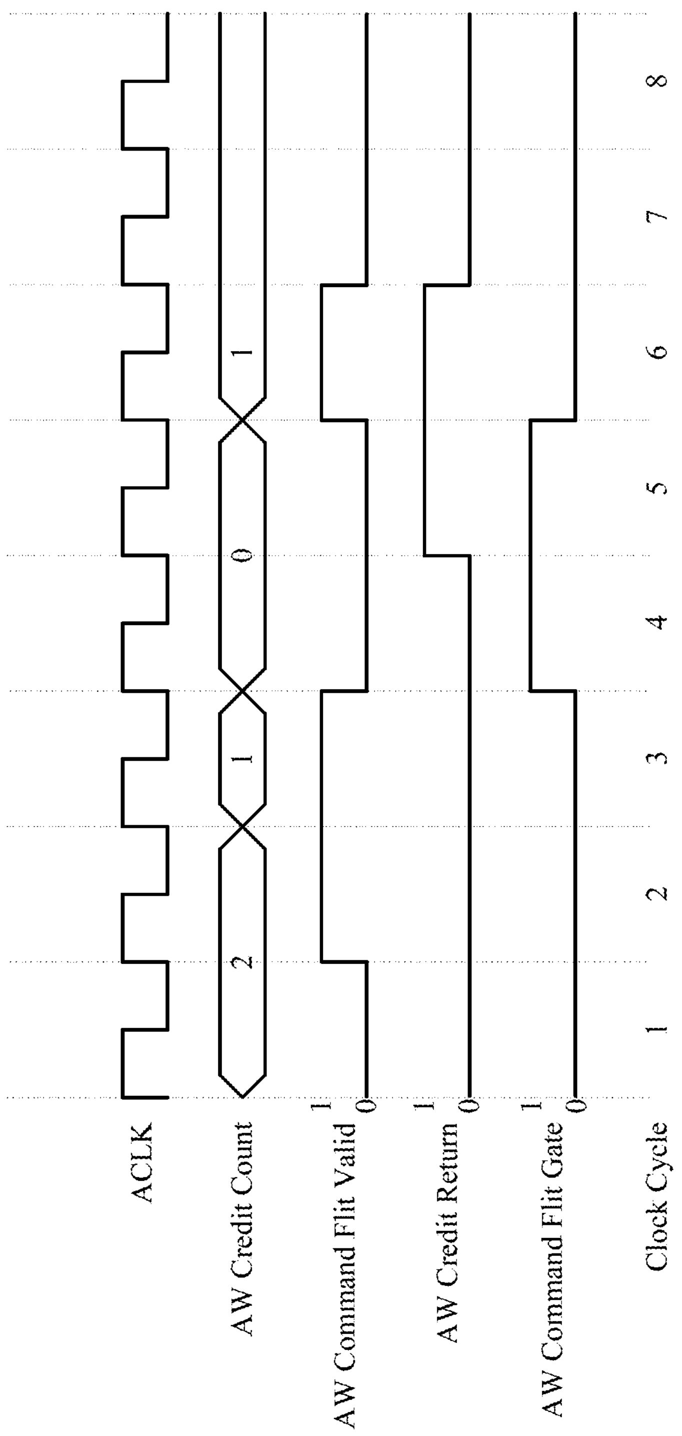
FIG. 7 depicts a timing diagram in accordance with one or more implementations as described herein.

FIG. 7 illustrates an example timing diagram 700 in accordance with one or more implementations as described herein. In the illustrated example, timing diagram 700 depicts an address clock (ACLK) signal (e.g. AXI bus clock signal), an address write (AW) credit count state, an AW command flit valid state, an AW credit return state, an AW command flit gate state, and clock cycles of the period of time depicted.

In some cases, ACLK may synchronize AXI signals. In some cases, AXI signals may be sampled on the rising edge of ACLK, and output signal changes may occur after that edge. As shown, AW credit count depicts that the credit count is 2 (e.g., 2 credits) during the first and second clock cycles. As shown, the AW command flit gate is not asserted (e.g., remains at 0) based on the credit count being non-zero (e.g., credit count of 1 or more credits).

As shown, AW command flit valid is asserted (e.g., switched from 0 to 1) at the start of the second clock cycle and unasserted at the end of the third clock cycle. At the rising edge of the second clock cycle, AW command flit valid is asserted and a first flit (e.g., first AW command flit) is transmitted. Accordingly, AW credit count is reduced to 1. At the rising edge of the third clock cycle, AW command flit valid is asserted and a second flit (e.g., second AW command flit) is transmitted. Accordingly, AW credit count is reduced to 0.

At the rising edge of the fourth clock cycle, the AW command flit gate is asserted (e.g., switched from 0 to 1) based on the credit count being zero. Asserting the AW command flit gate may gate (e.g., pause, hold, block, prohibit) an AW command flit from being transmitted while the credit count is zero.

As shown, the AW credit return is asserted (e.g., switched from 0 to 1) at the rising edge of the fifth clock cycle, indicating that an AW credit is returned or received. Based on the AW credit return being asserted, the AW credit count is increased to 1.

Figure 8:
FIG. 8 depicts a flow diagram illustrating an example method associated with the disclosed systems, in accordance with example implementations described herein.
Figure 8:
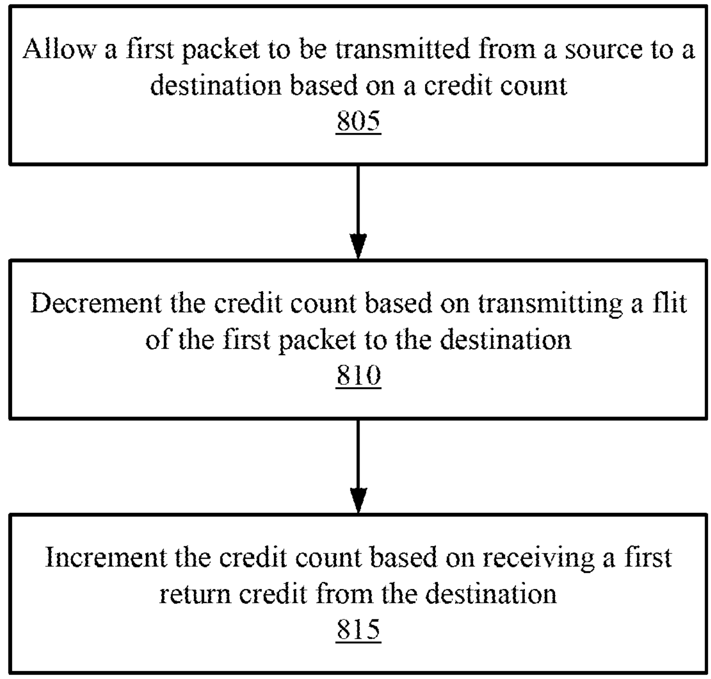

FIG. 8 depicts a flow diagram illustrating an example method 800 associated with the disclosed systems, in accordance with example implementations described herein. In some configurations, method 800 may be implemented by flow controller 140 of FIG. 1 and/or flow controller 230 of FIG. 2. In some configurations, method 800 may be implemented in conjunction with machine 105, components of machine 105, or any combination thereof. The depicted method 800 is just one implementation and one or more operations of method 800 may be rearranged, reordered, omitted, and/or otherwise modified such that other implementations are possible and contemplated.

At 805, method 800 may include allowing a first packet to be transmitted from a source to a destination based on a credit count. For example, compute die 405 may allow a first packet to be transmitted from to buffer die 410 based on a credit count.

At 810, method 800 may include decrementing the credit count based on transmitting a flit of the first packet to the destination. For example, compute die 405 may decrement the credit count based on transmitting a flit of the first packet to buffer die 410.

At 815, method 800 may include incrementing the credit count based on receiving a first return credit from the destination. For example, compute die 405 may increment the credit count based on receiving a first return credit from buffer die 410.

Figure 9:
FIG. 9 depicts a flow diagram illustrating an example method associated with the disclosed systems, in accordance with example implementations described herein.
Figure 9:
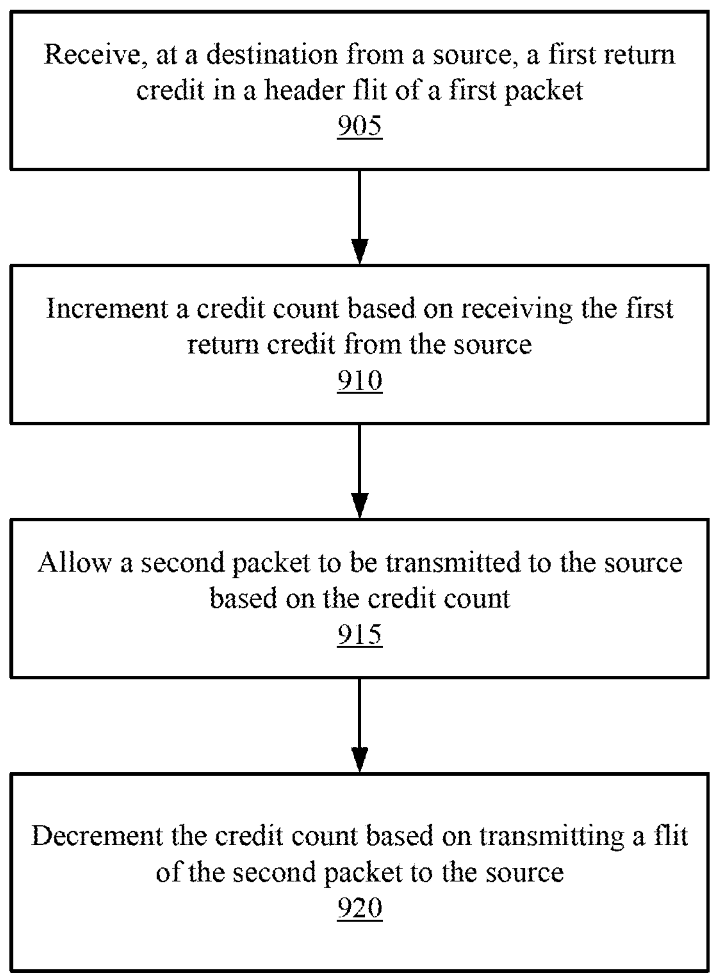

FIG. 9 depicts a flow diagram illustrating an example method 900 associated with the disclosed systems, in accordance with example implementations described herein. In some configurations, method 900 may be implemented by flow controller 140 of FIG. 1 and/or flow controller 230 of FIG. 2. In some configurations, method 900 may be implemented in conjunction with machine 105, components of machine 105, or any combination thereof. The depicted method 900 is just one implementation and one or more operations of method 900 may be rearranged, reordered, omitted, and/or otherwise modified such that other implementations are possible and contemplated.

At 905, method 900 may include receiving, at a destination from a source, a first return credit in a header flit of a first packet. For example, buffer die 410 may receive a first return credit in a header flit of a first packet from compute die 405.

At 910, method 900 may include incrementing a credit count based on receiving the first return credit from the source. For example, buffer die 410 may increment a credit count based on receiving the first return credit from compute die 405.

At 915, method 900 may include allowing a second packet to be transmitted to the source based on the credit count. For example, buffer die 410 may allowing a second packet to be transmitted to compute die 405 based on the credit count.

At 920, method 900 may include decrementing the credit count based on transmitting a flit of the second packet to the source. For example, buffer die 410 may decrement the credit count based on transmitting a flit of the second packet to compute die 405.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Arca Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples described herein set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of die-to-die (D2D) credit-based flow control, the method comprising:

allowing, at a source, a first packet to be transmitted from the source to a destination based on a credit count;

decrementing, at the source, the credit count based on transmitting a flit of the first packet to the destination; and incrementing, at the source, the credit count based on receiving a first return credit from the destination, wherein the first return credit is received in a header flit of a second packet transmitted from the destination to the source.

2. The method of claim 1, further comprising transmitting, to the destination, a second return credit in a header flit of the first packet based on data being removed from a stack of a buffer at the source.

3. The method of claim 2, wherein:

the first return credit includes an address read credit, an address write credit, or a write credit, and the second return credit includes a read credit or a write response credit.

4. The method of claim 2, wherein a size of the buffer is based on a round-trip delay between the source and the destination.

5. The method of claim 2, wherein a size of the buffer is based on a bandwidth of the source, a bandwidth of the destination, or a bandwidth between the source and the destination.

6. The method of claim 1, wherein the first return credit is piggybacked on the second packet based on the second packet including at least one payload flit.

7. The method of claim 1, wherein the second packet is received as a standalone message from the destination based on the second packet being configured without payload flits.

8. The method of claim 1, wherein transmission of return credits is synchronized to a clock cycle.

9. The method of claim 1, wherein allowing the packet to be transmitted from the source to the destination is based on the credit count being non-zero.

10. The method of claim 1, pausing transmission for at least one clock cycle based on a determination that the credit count is zero.

11. The method of claim 1, wherein the credit count is maintained on a protocol layer of a die-to-die interconnect of the source.

12. The method of claim 1, wherein the first packet includes a header flit, one or more payload flits, and a tail flit.

13. The method of claim 1, wherein the source comprises a first D2D physical layer (PHY) that is communicatively linked to a second D2D PHY of the destination.

14. The method of claim 1, wherein the source comprises a compute die and the destination comprises a buffer die.

15. A method of die-to-die (D2D) credit-based flow control, the method comprising:

receiving, at a destination from a source, a first return credit in a header flit of a first packet;

incrementing, at the destination, a credit count based on receiving the first return credit from the source;

allowing, at the destination, a second packet to be transmitted to the source based on the credit count; and decrementing, at the destination, the credit count based on transmitting a flit of the second packet to the source, wherein the first return credit is received in a header flit of a second packet transmitted from the destination to the source.

16. The method of claim 15, further comprising transmitting, to the source, a second return credit in a header flit of the second packet based on data being removed from a stack of a buffer at the destination.

17. The method of claim 16, wherein:

the first return credit includes a read credit or a write response credit, and the second return credit includes an address read credit, an address write credit, or a write credit.

18. The method of claim 15, wherein the destination comprises a buffer die and the source comprises a compute die.

19. A non-transitory computer-readable medium storing code that comprises instructions executable by a processor of a die-to-die (D2D) credit-based flow control device to:

allow, at a source, a first packet to be transmitted from the source to a destination based on a credit count;

decrement, at the source, the credit count based on transmitting a flit of the first packet to the destination; and increment, at the source, the credit count based on receiving a first return credit from the destination, wherein the first return credit is received in a header flit of a second packet transmitted from the destination to the source.

* * * * *